UNITED STATES PATENT OFFICE 2,346,107

PLASTIC METHYL METHACRYLATE

William S. Johnson, Philadelphia, Pa., assignor to Röhm & Haas Company, Philadelphia, Pa., a corporation of Delaware No Drawing. Application December 19, 1939, Serial No. 309,960

14 Claims. (Cl. 260—36)

This invention relates to a method for preparing methacrylic resins which are substantially free of elastic properties.

It is known that acrylic and methacrylic acids and their functional derivatives, such as esters, nitriles, amides, etc., polymerize to transparent, colorless resins which have found wide application in many industries. It has been proposed to use these resins in the preparation of molded articles, as the intermediate layer in shatterproof glass, as glass substitutes, and for many other purposes. One disadvantage of these materials, particularly in the manufacture of shaped articles, is that they are more or less elastic so that if the finished article is heated it has a pronounced tendency to deform. This is particularly true of the hard, rigid polymers, such as polymethylmethacrylate, which may be shaped by pressing or blowing at a somewhat elevated temperature and cooled while in the desired form. This property prevents such materials from being calendered into sheets and hinders them from being molded by extrusion or injection methods.

This disadvantage can be overcome by the addition of relatively large amounts of plasticizer such as tricresylphosphate, dibutyl phthalate, etc., but the amount of such plasticizer required to eliminate the elastic properties is usually so great that the desirable properties of the polymer such as hardness and strength, are substantially diminished.

It is an object of this invention to provide a method for reducing to a substantial extent the effects of the elastic properties of polymers of the acrylic and methacrylic acid series and make them suitable for molding purposes without the addition of any plasticizer.

It has been found that there are many non-polymerizable substances hereinafter described, which if added to the monomer will so change the polymerization as to limit the formation of polymers with pronounced elastic properties. It has also been found that the effects of the elastic properties of polymers made in the presence of these substances may be still further reduced by subjecting them to a mechanical action such as milling on a rubber mill at an elevated temperature. It has further been found that the effect of the elastic properties in polymers prepared in the absence of these non-polymerizable materials may be considerably reduced by subjecting such polymers to a milling action in the presence of a small amount of the non-polymerizable substance.

The non-polymerizable compounds which, when employed as set forth above, have the property of substantially reducing the effect of the elastic properties in polymers of the acrylic and methacrylic acid series, belong to several different classes. These include certain members of the following classes of compounds: salts of aromatic sulfonic acids, thiocarboxylic acids, acid amides, chlorides and anhydrides, esters, unsaturated aliphatic halides, mercaptans and polysulfides. The magnitude of the effect on reduction of the elastic properties varies considerably among these compounds. There is apparently no rule governing their behavior and the magnitude of their effect seems to be more or less individualistic.

The amount of these compounds which is effective in substantially reducing the effect of the elastic properties in these polymers is very small, usually less than 1%. Many of them are effective when present in amounts of 0.1% or less based on the weight of the polymer. It is obvious from this that these materials do not act as softening agents in the manner of the commonly used plasticizers.

When these compounds are present during the polymerization it is immaterial how the polymerization is carried out. The polymers may be prepared by any of the known methods as by polymerizing the pure monomer, by dissolving it in a solvent or emulsifying it in a non-solvent such as water. On milling the polymers thus obtained the resulting mass is substantially free of elastic properties. Likewise when the non-polymerizable material is milled into previously prepared polymer, the method by which the polymer is made is immaterial. After the milling, the polymer may be calendered into smooth sheets or reduced to powder of any desired grain size for use as a molding composition.

The following examples will illustrate the invention:

*Example 1.*—Methyl methacrylate containing 0.5% of benzoyl peroxide and 0.1% of barium phenanthrene-2-sulfonate was heated at about 80° C. until completely polymerized. It was then milled on a rubber mill heated to about 140° C. until a perfectly smooth sheet was obtained which required about five minutes. The polymer may then be calendered into sheets which after they have cooled have much less tendency to warp on subsequent heating than sheets prepared by direct polymerization. The polymer may also be ground to a powder suitable for hot-press or injection molding. Articles molded from this powder have considerably less tendency to deform on subsequent heating than do articles similarly molded from the usual polymers.

*Example 2.* — Polymethylmethacrylate was placed on a hot rubber mill and milled. It did not form a smooth sheet. While the material was being worked 0.5% of phthalic anhydride was added and within a few minutes a perfectly smooth sheet was obtained which could be used in the same manner as the material obtained according to Example 1.

Other compounds which have the same effect to a greater or less degree when employed in amounts ranging from 0.05 to 3% of the weight of the polymer are—

Potassium phenanthrene-2-sulfonate
  Sodium benzene sulfonate
  Sodium m-nitro benzene sulfonate
  Sodium 2,4-dinitro α-naphthol 7-sulfonate
  Thiosalicylic acid
  Thiourea
  Tetramethyl thiuram disulfide
  Ethyl crotonate
  Maleic anhydride
  Acetamide
  α-Mono bromo isovaleryl urea
  p-Toluene sulfone amide
  p-Toluene sulfone chloride
  Methallyl chloride These compounds are also effective in substantially reducing the elastic properties of other polymeric materials such as ethylmethacrylate, isobutyl methacrylate, ter. butyl methacrylate and joint polymers of these and of methyl methacrylate with other polymerizable materials such as esters of acrylic acid, higher esters of methacrylic acid, the amides, nitriles, chlorides, etc., of these acids, styrene, vinyl esters, etc.

As noted above there is no general rule governing the behavior of these compounds. Moreover, they may belong to many chemically unrelated classes. It may, however, be said of all of these compounds that they have the common property of reducing or limiting the chain length of the polymeric molecule when present in very small amounts during polymerization. Whether a compound has this property and therefore, whether it may be used in practicing the present invention, may be readily determined by viscosity measurements on solutions of the polymers. A convenient method of making this test is to make a solution of monomeric methyl methacrylate in a solvent, for example ethyl acetate, and divide this into two portions. To one of the portions is then added the accelerator, benzoyl peroxide for example, and a definite amount of the material to be tested. To the other only the accelerator is added. Both portions are then subjected to the same polymerizing conditions, for example they may be heated to 80° C. for a period of time sufficient to complete the polymerization. The solutions are then cooled and their viscosity determined. The solution containing the compound capable of reducing the elastic properties of the polymeric molecule will have a lower viscosity than the solution to which no such material was added.

The compounds which have the property of reducing or limiting the chain length of the polymeric molecule do not act as retarders or inhibitors of polymerization. This takes place just as rapidly in the presence of these compounds as it does in their absence. On the other hand, the known retarders such as resorcinol, hydroquinone, etc., do not have the property of being able to reduce or limit the chain length of the polymeric molecule.

I claim:

1. The process of rendering a methacrylic resin substantially free of elastic properties which cause deformation when shaped articles thereof are heated which comprises subjecting a polymer of a member of the group consisting of methyl methacrylate and ethyl methacrylate to a milling action on hot rolls in the presence of 0.05% to 3% (based on the weight of the polymer) of a compound selected from the group consisting of barium phenanthrene-2-sulfonate, potassium phenanthrene-2-sulfonate, sodium m-nitro benzene sulfonate, sodium 2,4-dinitro α-naphthol 7-sulfonate, thiosalicylic acid, thiourea, ethyl crotonate, maleic anhydride, phthalic anhydride, acetamide, α-mono bromo isovaleryl urea, and methallyl chloride.

2. The process of rendering a methacrylic resin substantially free of elastic properties which cause deformation when shaped articles thereof are heated which comprises subjecting polymerized methyl methacrylate to a milling action on hot rolls in the presence of 0.05% to 3% (based on the weight of the polymerized methyl methacrylate) of a compound selected from the group consisting of barium phenanthrene-2-sulfonate, potassium phenanthrene-2-sulfonate, sodium m-nitro benzene sulfonate, sodium 2,4-dinitro α-naphthol 7-sulfonate, thiosalicylic acid, thiourea, ethyl crotonate, maleic anhydride, phthalic anhydride, acetamide, α-mono bromo isovaleryl urea, and methallyl chloride.

3. The process of rendering a methacrylic resin substantially free of elastic properties which cause deformation when shaped articles thereof are heated which comprises subjecting a polymer of a member of the group consisting of methyl methacrylate and ethyl methacrylate to a milling action on hot rolls in the presence of 0.05% to 3% (based on the weight of the polymer) of ethyl crotonate.

4. The process of rendering a methacrylic resin substantially free of elastic properties which cause deformation when shaped articles thereof are heated which comprises subjecting a polymer of a member of the group consisting of methyl methacrylate and ethyl methacrylate to a milling action on hot rolls in the presence of about 0.5% (based on the weight of the polymer) of ethyl crotonate.

5. The process of rendering a methacrylic resin substantially free of elastic properties which cause deformation when shaped articles thereof are heated which comprises subjecting a polymer of a member of the group consisting of methyl methacrylate and ethyl methacrylate to a milling action on hot rolls in the presence of about 0.5% (based on the weight of the polymer) of barium phenanthrene-2-sulfonate.

6. The process of rendering a methacrylic resin substantially free of elastic properties which cause deformation when shaped articles thereof are heated which comprises subjecting a polymer of a member of the group consisting of methyl methacrylate and ethyl methacrylate to a milling action on hot rolls in the presence of 0.05% to 3% (based on the weight of the polymer) of methallyl chloride.

7. The process of rendering a methacrylic resin substantially free of elastic properties which cause deformation when shaped articles thereof are heated which comprises subjecting polymeric methyl methacrylate to a milling action on hot rolls in the presence of about 0.5% (based on the weight of the polymeric methyl methacrylate) of methallyl chloride.

8. The process of rendering a methacrylic resin substantially free of elastic properties which cause deformation when shaped articles thereof are heated which comprises polymerizing a member of the group consisting of methyl methacrylate and ethyl methacrylate in the presence of 0.05% to 3% (based on the weight of the polymer) of a compound selected from the group consisting of barium phenanthrene-2-sulfonate, potassium phenanthrene-2-sulfonate, sodium m-nitro benzene sulfonate, sodium 2,4-dinitro α-naphthol 7-sulfonate, thiosalicylic acid, thiourea, ethyl crotonate, maleic anhydride, phthalic anhydride, acetamide, α-mono bromo isovaleryl urea, and methallyl chloride, and then subjecting the resulting polymer to a milling action on hot rolls.

9. The process of rendering a methacrylic resin substantially free of elastic properties which cause deformation when shaped articles thereof are heated which comprises polymerizing methyl methacrylate in the presence of 0.05% to about 3% (based on the weight of the polymer) of a compound selected from the group consisting of barium phenanthrene-2-sulfonate, potassium phenanthrene-2-sulfonate, sodium m-nitro benzene sulfonate, sodium 2,4-dinitro α-naphthol 7-sulfonate, thiosalicylic acid, thiourea, ethyl crotonate, maleic anhydride, phthalic anhydride, acetamide, α-mono bromo isovaleryl urea, and methallyl chloride, and then subjecting the resulting polymer to a milling action on hot rolls.

10. The process of rendering a methacrylic resin substantially free of elastic properties which cause deformation when shaped articles thereof are heated which comprises polymerizing a member of the group consisting of methyl methacrylate and ethyl methacrylate in the presence of 0.05% to 3% (based on the weight of the polymer) of ethyl crotonate, and subjecting the resulting polymer to a milling action on hot rolls.

11. The process of rendering a methacrylic resin substantially free of elastic properties which cause deformation when shaped articles thereof are heated which comprises polymerizing methyl methacrylate in the presence of about 0.5% (based on the weight of the polymer) of ethyl crotonate, and subjecting the resulting polymer to a milling action on hot rolls.

12. The process of rendering a methacrylic resin substantially free of elastic properties which cause deformation when shaped articles thereof are heated which comprises polymerizing a member of the group consisting of methyl methacrylate and ethyl methacrylate in the presence of about 0.5% (based on the weight of the polymer) of barium phenanthrene-2-sulfonate, and subjecting the resulting polymer to a milling action on hot rolls.

13. The process of rendering a methacrylic resin substantially free of elastic properties which cause deformation when shaped articles thereof are heated which comprises polymerizing a member of the group consisting of methyl methacrylate and ethyl methacrylate in the presence of about 0.05% to about 3% (based on the weight of the polymer) of methallyl chloride, and subjecting the resulting polymer to a milling action on hot rolls.

14. The process of rendering a methacrylic resin substantially free of elastic properties which cause deformation when shaped articles thereof are heated which comprises mixing with a monomer selected from the group consisting of methyl methacrylate and ethyl methacrylate from 0.5% to about 3% (based on the weight of the resulting polymer) of a compound selected from the group consisting of barium phenanthrene-2-sulfonate, potassium phenanthrene-2-sulfonate, sodium m-nitro benzene sulfonate, sodium 2,4-dinitro α-naphthol 7-sulfonate, thiosalicylic acid, thiourea, ethyl crotonate, maleic anhydride, phthalic anhydride, acetamide, α-mono bromo isovaleryl urea, and methallyl chloride, polymerizing the monomer, and subjecting the resulting polymer to a milling action on hot rolls.

WILLIAM S. JOHNSON.